United States Patent [19]
Udd

[11] Patent Number: 5,046,848
[45] Date of Patent: Sep. 10, 1991

[54] FIBER OPTIC DETECTION SYSTEM USING A SAGNAC INTERFEROMETER

[75] Inventor: Eric Udd, Huntington Beach, Calif.

[73] Assignee: McDonnell Douglas Corporation, Long Beach, Calif.

[21] Appl. No.: 405,876

[22] Filed: Sep. 8, 1989

[51] Int. Cl.$^5$ ................................. G01B 9/02
[52] U.S. Cl. ................... 356/345; 356/350; 250/227.19
[58] Field of Search ............. 356/345, 350, 351, 349; 250/227.19

[56] References Cited

U.S. PATENT DOCUMENTS

| 4,881,817 | 11/1989 | Kim et al. | 356/350 |
| 4,885,462 | 12/1989 | Dakin | 250/227.19 |
| 4,898,468 | 2/1990 | Udo | 356/345 |

FOREIGN PATENT DOCUMENTS 2201256  8/1988  United Kingdom ............... 356/345

Primary Examiner—Samuel Turner
Attorney, Agent, or Firm—Donald E. Stout; Gregory A. Cone; John P. Scholl

[57] ABSTRACT

The process and apparatus of at least two sensor configurations enable both the location and severity of an environmental disturbance on an optic path to be measured.

46 Claims, 2 Drawing Sheets

FIBER OPTIC DETECTION SYSTEM USING A SAGNAC INTERFEROMETER

BACKGROUND OF THE INVENTION

This invention relates an improvement of the invention disclosed in U.S. Application No. 298,982, filed June 20, 1988 entitled "Sagnac Distributed Sensor".

The present invention relates generally to fiber optic detection systems based on the Sagnac interferometer. In a first mode of operation the Sagnac interferometer disclosed by this invention responds to time varying environmental disturbances in a manner similar to that described by Richard Cahill and Eric Udd in U.S. Pat. No. 4,375,680, "Optical Acoustic Sensor", and by Eric Udd in "Fiber-Optic Acoustic Sensor Based on the Sagnac Interferometer", Proceedings of SPIE, Vol. 425, Pg. 90, 1983. There it was shown that the amplitude of the response to a time varying disturbance depends upon its position in the Sagnac loop where the sensing occurs. If the disturbance occurs near the center of the loop, the response becomes vanishingly small, while for a disturbance near the ends of the loop, the response approaches the maximum possible amplitude.

In a second mode of operation, a phase sensitive detection method using an amplitude modulated light source is configured to have sensitivity that is constant over the length of the sensing loop. This configuration is described in a paper by R.S. Rogowski et al.,"A Method for Monitoring Strain in Large Structures: Optical and Radio Frequency Devices", *Review of Progress in Quantitative NDE*. Vol. 7a, p.559 (Plenum Press, 1988).

John Dakin, in a paper entitled "A Novel Distributed Optical Fiber Sensing System Enabling Location of a Disturbance in a Sagnac Loop Interferometer", *Proceedings of the SPIE*, v. 838, pg. 325 (1987), describes a combination of Mach-Zehnder and Sagnac interferometers where, along a single fiber optic path, the Mach-Zender interferometer has direct detection sensitivity while the Sagnac interferometer has position dependent sensitivity as noted above. By ratioing the position dependent and position independent signals, the location and magnitude of the disturbance may be determined. This latter invention is severely limited by the contradictory requirements of the Mach-Zehnder and Sagnac interferometers.

For the Mach-Zehnder interferometer optimum performance is achieved by utilizing a long coherence length light source with high frequency stability. The performance of these light sources degrade rapidly with light feedback into the source. The Sagnac interferometer has optimum performance when a low coherence length light source is used and its performance degrades rapidly as the coherence length increases due to Rayleigh backscatter from the sensing loop.

The contradictory requirements of these interferometers result in a light source which is a compromise resulting in substantial limitations in the performance of one or both interferometers in the Dakin device. The situation is further aggravated by the combination of Sagnac and Mach-Zehnder interferometers as described by Dakin, resulting in direct feedback of the signal light into the light source. Such feedback results in a worst case scenario for the light source which would optimize the performance of the Mach-Zehnder.

What is desired is an improved fiber optic sensor that is capable of sensing both the location and magnitude of a disturbance along a single fiber without the limitations and excess noise generated by mixing the highly incompatible Sagnac and Mach-Zehnder interferometers.

SUMMARY OF THE INVENTION

The device and method of the present invention is an improvement which allows a simpler, more cost effective implementation of the Distributed Sagnac Fiber Optic Sensor while affording the same advantages obtainable with the system of the earlier Ser. No. 208,982 Pat. application referred to above.

The present invention also allows the magnitude and location of a time varying disturbance to be determined along a single fiber by using a Sagnac interferometer based configuration that operates in a mode which allows position dependent sensing. An amplitude modulated light source is used in combination with phase sensitive detection techniques to simultaneously measure the magnitude of the environmental effect, independent of position. These outputs are then processed to determine position and magnitude of the disturbance.

In one embodiment, a single light source is used for both the magnitude and position measurement. In another embodiment, the magnitude and location of the disturbance are simultaneously determined using separate light sources.

Omitting, for the purposes of this summary an explanation of the more technical performance elements of the system, the invention consists of a light source which injects light into a fiber and beam conditioning elements before being split into counterpropagating light beams around a loop of optical fiber by a light beamsplitter. When a time varying disturbance impinges on the fiber loop, the relative phase shift generated between the counterpropagating light beams will depend on the location of the disturbance.

For example, if the disturbance is located near the center of the sensing loop, both counterpropagating light beams will arrive at essentially the same time and experience essentially the same disturbance. The net result is that the relative phase shift between the counterpropagating light beams will be small and when the two beams recombine at the beamsplitter the intensity change due to interference between the two beams will be small.

When the disturbance occurs at a position that is substantially offset from the center of the fiber loop, the two beams arrive at significantly different times and the disturbance has time to effect a larger change. This results in a larger relative phase shift between the counterpropagating light beams and a larger amplitude intensity based signal when the two beams are interferometrically recombined within the beamsplitter.

In the second mode of operation, the light source is amplitude modulated at a high frequency and the phase of the amplitude modulated signal is compared to an electrical reference. In this mode of operation the signal generated by an environmental disturbance along the sensing loop is independent of position.

Both of these loops have a common region consisting of a single fiber which is used in combination to measure the magnitude and location of an environmental disturbance.

For certain applications it is desirable to measure more than one type of environmental effect, such as strain, temperature and acoustics along the same fiber. This can be done by using multiple light sources that vary in their output operating wavelength to form, in effect, multiple equations in multiple unknowns that may be solved simultaneously to extract the various environmental disturbances.

BRIEF DESCRIPTION OF THE DRAWINGS

The above-mentioned and other features and objects of this invention will become more apparent by reference to the following description taken in conjunction with the accompanying drawing, in which.

DESCRIPTION OF THE PREFERRED EMBODIMENTS

Figure 1:
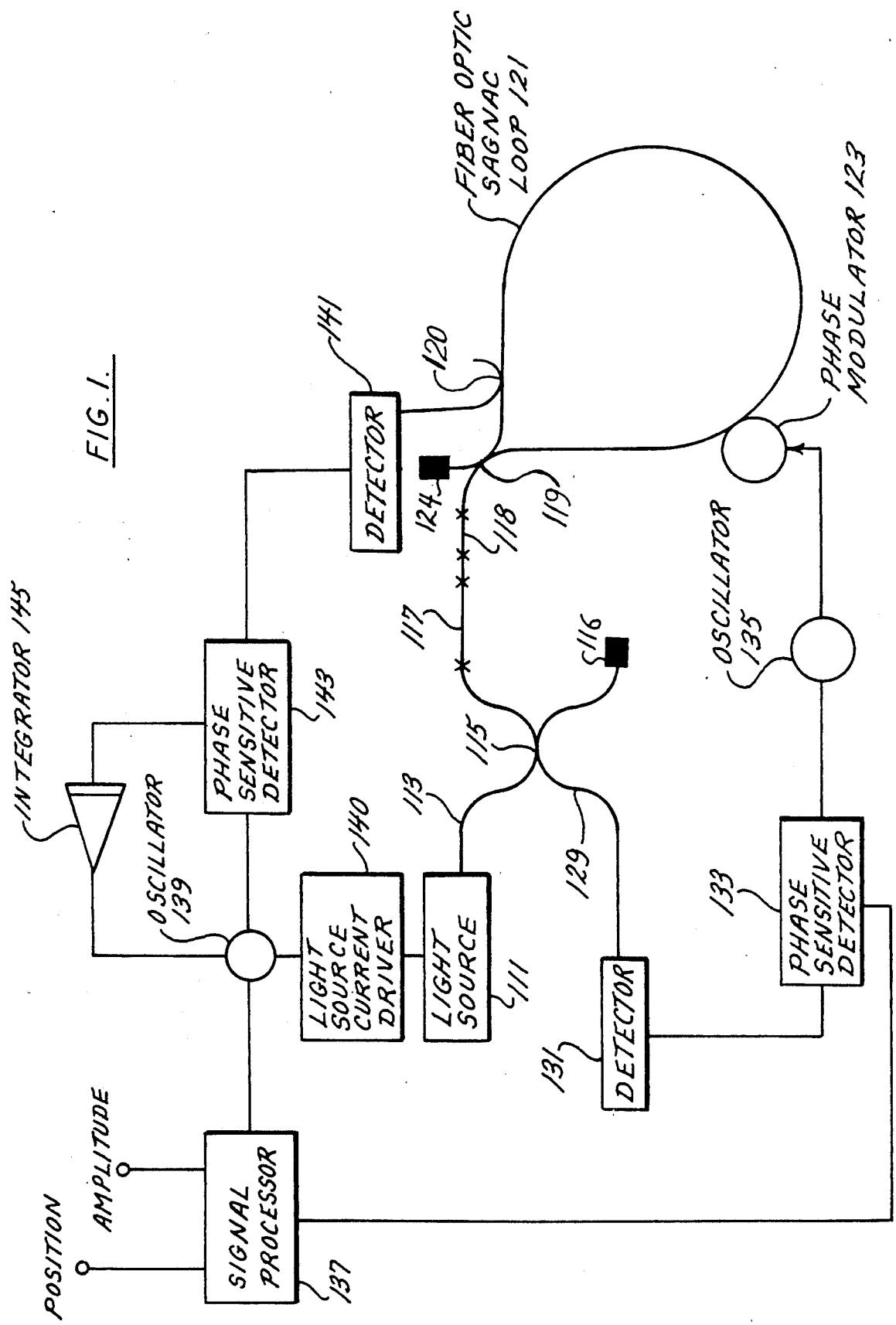
FIG. 1 is a schematic of the improved distributed Sagnac sensor of the present invention utilizing a single light source; and, FIG. 2 is a schematic of the improved distributed Sagnac sensor of the present invention utilizing dual light sources.

Referring to FIG. 1 there is shown the improved Sagnac distributed sensor of the present invention utilizing a single light source. The Sagnac distributed sensor of FIG. 1 has a light source 111 which may be a light emitting diode (LED) or superradiant diode.

Light source 111 is optically connected, by means of an optic fiber 113, to channel light into a conventional fiber optic beamsplitter 115. One output of beamsplitter 115 is a dead end termination 116. The other output of the beamsplitter 115 is connected to guide light into a fiber polarizer 117. Fiber polarizer 117 is a highly birefringent optical fiber which only supports light propagating in one polarization state. Fiber polarizer 117 strongly attenuates the orthogonally polarized state of light.

The fiber polarizer 117 is connected to channel light into an intensity maintenance element 118. Intensity maintenance element 118 is typically a Lyot depolarizer consisting of two lengths of birefringent polarization preserving single mode optical fiber spliced with their optical axes aligned at forty five degrees relative to each other. Intensity maintenance element 118 is connected to continue the propagation of light into a conventional beamsplitter 119. One output of beamsplitter 119 is connected to one port of a beamsplitter 120. Beamsplitter 120 is connected to one end of a fiber optic Sagnac loop 121.

At the other end of Sagnac loop 121 is an optically connected phase modulator 123. Phase modulator 123 could be an integrated optic phase modulator or a fiber phase modulator consisting of an optical fiber wrapped about a piezoelectric mandrel which stretches when a voltage is applied to the piezoelectric mandrel. Phase modulator 123 is connected back into beamsplitter 119 to form a looping optical path with respect to beamsplitter 119. One of the other outputs of beamsplitter 119 is a dead end termination 124.

Beam splitter 115 is also connected, by means of optical fiber 129, to a detector 131. Detector 131 could be a PIN photodiode or avalanche photodiode detector. Detector 131 is electrically connected to a phase sensitive detector 133. Phase sensitive detector 133 is an electronic device which compares the phase of the oscillator 135 to the output of the detector 131, and outputs a voltage proportional to the phase difference between the signals. Phase sensitive detector 133 is also electrically connected to an oscillator 135.

Oscillator 135 is also connected to the phase modulator 123. Phase sensitive detector 133 is electrically connected to a signal processor 137. Signal processor 137 is electrically connected to a variable frequency oscillator 139. Signal processor 137 is used to convert the phase sensitive detector 133 output into an output voltage proportional to the position of an environmental disturbance by ratioing the signal from phase sensitive detector 133 to the output signal from the oscillator 139.

Oscillator 139 is connected to a light source driver 140. Light source driver 140 contains circuitry to control the current supplied to the light source 111 and supplies an oscillatory current source at the same frequency as the oscillator 139 as well as a DC current source to maintain the desired light intensity of the system.

Beam splitter 120 is also connected to a detector 141 which is similar in type to detector 133. Detector 141 is electrically connected to a phase sensitive detector 143. Phase sensitive detector 143 is connected to the input of an integrator 145, and to the output of oscillator 139. The output of integrator 145 is connected to the input of oscillator 139.

Phase sensitive detector 143, like phase sensitive detector 133, is an electronic device which compares the phase of the variable oscillator 139 to the output of the detector 141, and outputs a voltage proportional to the phase difference between the signals.

The operation of the improved distributed Sagnac fiber optic sensor using a single light source, as shown in FIG. 1, is as follows. Light from a light source 111 is coupled into an optical fiber 113. The light beam is then split into two light beams by the input/output coupler 115. One of the light beams propagates through a fiber polarizer 117 and intensity maintenance element 118 (this element could be a fiber based Lyot depolarizer or alternativelY polarization preserving fiber could be used throughout the system). The other light beam is unused, proceeding to a dead end termination.

The light beam from intensity maintenance element 118 is then split into counterpropagating light beams by the beamsplitter 119. The light then propagates in opposite directions about the fiber optic coil 121. A time varying environmental effect along the fiber optic coil 121, such as physical deformation, local heating or bending or tension, will cause a nonreciprocal phase shift between the counterpropagating light beams which will depend on the location of the environmental effect along the coil and the characteristic frequency of the event. This signal is detected by using an AC dynamic bias to optimize sensitivity to the environmentally induced effect. This technique is well known from the open literature on fiber optic gyros.

The AC bias signal is caused by a nonreciprocal modulation of the relative phase of the counterpropagating light beam generated by the phase modulator 123 driven by the oscillator 135. The two counterpropagating light beams recombine on the beamsplitter 119 and pass back through the intensity maintenance element 118, the polarizer 117, the coupler 115 and through the fiber lead 129 and onward to the detector 131.

The resultant environmental signal is demodulated by the phase sensitive detector 133 which is connected to the oscillator 135 whose output frequency acts as a reference. The output from the phase sensitive detector 133 is then directed to the processor 137.

The second part of the system consists of the oscillator 139 which amplitude modulates the light source 111 at a high frequency. This frequency can be on the order of hundreds of megahertz. This modulated light beam then propagates into the coupling fiber 113 and is split by the beamsplitter 115. This light beam is directed through the elements 117 and 118 and through the beamsplitter 119.

The amplitude modulated light beam then propagates through the fiber optic Sagnac loop 121 and is coupled out to the detector 141 by the beamsplitter 120. Beam splitter 120 taps off a portion of the light circulating about the fiber optic loop 121.

The relative phases of the outputs from the detector 141 and the oscillator 139 are then compared by the phase sensitive detector 143 whose output is feed into an integrator 145 whose output in turn is used to correct the output frequency of the oscillator 139 so that the phases of the signals on the phase sensitive detector 143 are matched in a manner analogous to that described in association with U.S. Pat. No. 4,299,490 entitled "Phase Nulling Optical Gyro" of inventors Cahill and Udd.

The frequency output of the oscillator 139 is then fed into the processor 137. The frequency output is proportional to the amplitude of the environmental signal and it can be used in combination with the output from the phase sensitive detector 133 to determine the position of the disturbance along the fiber loop 121. The information received from phase sensitive detector 133 is of a composite form in that it receives a signal whose intensity is dependent upon both the location and intensity of the environmental disturbance.

For example, lets assume an environmental effect having a magnitude from 1 to 10. A magnitude 1 in the physical deformation category could be a gentle tap on optic fiber 121 with a magnitude 10 represented by a smashing blow. A gentle tap at a point distant from the center of fiber loop 121 may produce the same magnitude signal from phase sensitive detector 133 as would a crashing blow administered to a point near the center of fiber loop 121. The information from phase sensitive detector 133 is then "composite" in nature.

However, the information from oscillator 139 defines the magnitude of the environmental effect. This part of FIG. 1 conveys the information as to whether the disturbance was a gentle tap or a crashing blow. It is this information with which we "normalize" the information from phase sensitive detector 133. This normalization can be done in an analog or a digital fashion.

The signal from oscillator 139 can be converted to a voltage proportional to its frequency within signal processor 137. This voltage can be valued and divided into the value of the voltage from phase sensitive detector 133 to arrive at the position information. Alternatively, a digital computer can use a look up table to find the values associated with the frequency signal output by oscillator 139, and divide this value into a digital value obtained by analog to digitally converting the voltage signal of phase sensitive detector 133.

Figure 2:
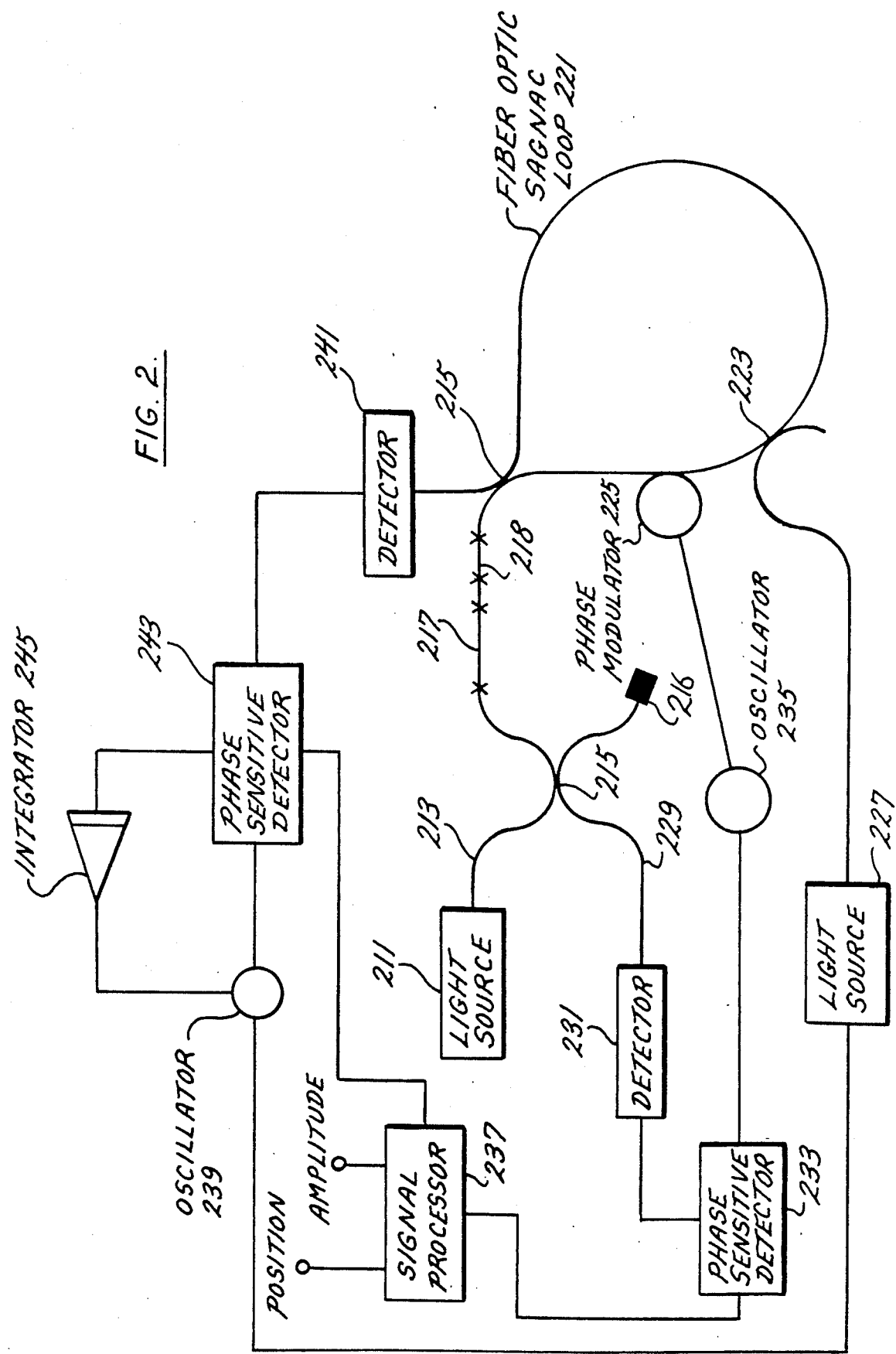

Referring to FIG. 2, a different configuration is shown. The configuration of FIG. 2 accomplishes the same objectives as the configuration of FIG. 1, however, the configuration of FIG. 2 utilizes two light sources. The Sagnac distributed sensor of FIG. 2 also has a light source 211 which may be a light emitting diode (LED) or superradiant diode. Light source 211 is conventionally optically connected, by means of an optic fiber 213, to a conventional beamsplitter 215. One end of beamsplitter 215 ends in a dead end termination 216. One of the other outputs of the beamsplitter 215 is connected to a fiber polarizer 217 which is of the same type as fiber polarizer 117.

Fiber polarizer 217 is connected to channel light into an intensity maintenance element 218. Intensity maintenance element 218 is connected to a conventional beamsplitter 219. One output of beamsplitter 219 forms the fiber optic Sagnac loop 221.

The other end of Sagnac loop 221 is optically connected to a beamsplitter 223. Beam splitter 223 is connected to a phase modulator 225 which acts in the same fashion as phase modulator 123. Phase modulator 225 is connected to one leg of beamsplitter 219. Another output of beamsplitter 223 is connected to a light source 227.

Beam splitter 215 is also connected to a detector 231 via a fiber section 229. Detector 231 is of the same type as detector 131 of FIG. 1. Detector 231 is electrically connected to a phase sensitive detector 233. Phase sensitive detector 233 has an input electrically connected to an oscillator 235. Oscillator 235 has an output electrically and controllably connected to phase modulator 225. Phase sensitive detector 233 has an output electrically connected to a signal processor 237.

Beam splitter 219 is also connected to a detector 241 in a direction opposite fiber loop 221. The output of detector 241 is electrically connected to the input of phase sensitive detector 243. Phase sensitive detector 243 is connected to an integrator 245, and to a variable frequency oscillator 239.

The operation of the improved distributed Sagnac fiber optic sensor using dual light sources, as shown in FIG. 2, is as follows. Light from a light source 211 is coupled into an optical fiber 213. The light from the source 211 is selected so that only detector 231 responds to it while detector 241 is insensitive. The detectors 231 and 241 can be made color sensitive by using color filters, gratings or through choice of components. The light beam is then split into two light beams by the input/output coupler 215. The beam propagates through a fiber polarizer 217 and intensity maintenance element 218 (this element could be a fiber based Lyot depolarizer or alternatively polarization preserving fiber could be used throughout the system).

The light beam is then split into two light beams by the beamsplitter 219. The light then counterpropagates in opposite directions about the fiber optic coil 221. A time varying environmental effect, such as discussed in relationship to FIG. 1, along the fiber optic coil 221 will cause a nonreciprocal phase shift between the counterpropagating light beams that will depend on location of the environmental effect along the coil and the characteristic frequency of the event. This signal is detected by using an AC dynamic bias to optimize sensitivity to the environmentally induced effect.

The AC signal caused by a nonreciprocal modulation of the relative phase of the counterpropagating light beams is generated by the phase modulator 225 driven by the oscillator 235. The two counterpropagating light beams recombine on the beamsplitter 219 and pass back through the intensity maintenance element 218, the polarizer 217, the coupler 215, through optic fiber section 229, and onward to the detector 231.

The resultant environmental signal is demodulated by the phase sensitive detector 233. The output frequency of oscillator 235 acts as a reference. The output from the phase sensitive detector 233 is then directed to the processor 237.

The second part of the system consists of the variable frequency oscillator 239 which amplitude modulates the light source 227 at a high frequency. The light from the source 227 is chosen so that only the detector 241 responds to it. This frequency can also be on the order of hundreds of megahertz. This modulated light beam is then sent to beamsplitter 223 to be directed into the fiber loop 221.

The amplitude modulated light beam then propagates through the fiber optic Sagnac loop 221 and is coupled out to the detector 241 by the central beamsplitter 219. The relative phases of the outputs from the detector 241 and the oscillator 239 are then compared by the phase sensitive detector 243 whose output is fed into an integrator 245 whose output in turn is used to correct the output frequency of the oscillator 239 so that the phases of the signals on the phase sensitive detector 243 are matched in a manner analogous to that described in association with the aforementioned U.S. Pat. No. 4,299,490 entitled "Phase Nulling Optical Gyro" of inventors Cahill and Udd.

The output of phase sensitive detector 243 is then fed into the processor 237. A second output of phase sensitive detector 243 is proportional to the amplitude of the environmental signal and it can be used in combination with the output from the phase sensitive detector 233 to determine the position of the disturbance along the fiber loop. The manner of operation of processor 237 is the same as that described for processor 137 in FIG. 1.

In the present invention, temperature increases will cause optical fibers 121 of FIG. 1 and 221 of FIG. 2 to experience an optical pathlength change. This will cause the phases of the counterpropagating light beams to shift with respect to each other. The magnitude of the temperature change will determine the extent of the phase shift.

The same is true for other environmental disturbances such as strain and tension. The phase shifts produced in the present invention for an environmental disturbance occurs over a very small time frame. The extent of the phase shift depends upon the severity and time dependence of the environmental disturbance. The relative phase shifts carry composite information about both the severity and location of an environmental disturbance.

The foregoing disclosure and description of the invention are illustrative and explanatory thereof, and various changes in the optical circuit elements, the medium through which the light propagates, and light beam conditioning devices, as well as the details of the illustrated configuration may be made without departing from the spirit and scope of the invention.

I claim:

1. A fiber optic sensor, comprising:
optical path means for facilitating the propagation of light, said optical path means having first and second ends;
light emitting means for producing light energy;
first beam splitting means, having first, second and third ports, for directionally transporting light energy incident on said first port to said second port, and for directionally transporting light energy incident on said second port to said third port, said first port coupled to said light emitting means;
second beam splitting means having first, second, and third ports for directionally transporting light energy incident on said first port to said second and third ports, and for directionally transporting light energy incident on said second and third ports to said first port, said first port of said second beam splitting means coupled to said second port of said first beam splitting means said second port of said second beam splitting means being connected to said first end of said optical path means, said third port of said second beam splitting means being connected to said second end of said optical path means;
third beam splitting means having first, second and third ports, for directionally transporting light energy incident on said first port to said second port, and for directionally transporting light energy incident on said second port to said first and third ports, said first port of said third beam splitting means being coupled to said second port of said second beam splitting means;
phase modulation means connected along said optical path means and being coupled to said second port of said third beamsplitting means, for impressing a modulation frequency on light propagating in both directions along said optical path means, said phase modulation means being at least slightly offset from the center of said optical path means with respect to said second beam splitting means;
first phase sensitive detection means, optically connected to said third port of said first beam splitting means, and also connected to said phase modulation means, for detecting light from said first beam splitting means;
second phase sensitive detection means, optically connected to said third port of said third beam splitting means and to said light emitting means, for detecting light from said third beam splitting means, said second phase sensitive detection means comprising:
a detector, optically connected to said third port of said third beam splitting means, for detecting light from said third beam splitting means and producing a signal indicative of the characteristics of said second beam of light;
a phase sensitive detector, electrically connected to said detector, for demodulating said phase modulated frequency impressed upon said light propagating along said optical path means;
an integrator having an input connected to said phase sensitive detector and an output; and
variable oscillation means, having an input coupled to said output of said integrator and a first output coupled to said phase sensitive detector of said second phase sensitive detection means, a second output coupled to said light emitting means, and a third output connected to a signal processor means, said processor means being connected to said first and said second phase sensitive detection means for providing a position output and an amplitude output for the location and severity, respectively, of an environmental disturbance along said optical path means.

2. The fiber optic sensor of claim 1 wherein said light emitting means further comprises a superradiant diode.

3. The fiber optic sensor of claim 1 wherein said light emitting means further comprises a light emitting diode.

4. The fiber optic sensor of claim 1 wherein said optical path means further comprises an optical fiber.

5. The fiber optic sensor of claim 1 wherein said phase modulation means further comprises an integrated optic modulator.

6. The fiber optic sensor of claim 1 wherein said first phase sensitive detection means further comprises:

an oscillator connected to said phase modulation means;

a phase sensitive detector connected to said oscillator; and, a detector electrically connected to said phase sensitive detector of said first phase sensitive detection means and optically coupled to said third port of said first beam splitting means.

7. The fiber optic sensor of claim 6 wherein said phase modulator is an integrated optic modulator.

8. The fiber optic sensor of claim 1 wherein said first, second and third beam splitting means further comprise fiber optic beamsplitters.

9. The fiber optic sensor of claim 6 wherein said first and said second beam splitting means each further comprises a fiber optic beamsplitter.

10. The fiber optic sensor of claim 1 wherein said optical path means further comprises at least one optical fiber.

11. The optic sensor of claim 1 further comprising:

polarization means, optically coupled to said second port of said first beam splitting means, for polarizing said light produced from said light emitting means; and, intensity maintenance means, optically coupled to said polarization means and to said first port of said second beam splitting means, for maintaining the power of said light emanating from said light emitting means.

12. The optic sensor of claim 1 wherein said light emitting means further comprises:

a light source current driver having an input coupled to said second phase sensitive detection means, and an output; and, a light source having an input coupled to said output of said light source current driver, and an output coupled to said first port of said first beam splitting means.

13. A fiber optic sensor, comprising:

optical path means for facilitation the propagation of light, said optical path means having first and second ends;

light emitting means for producing light energy;

first beam splitting means, having first, second and third ports, for directionally transporting light energy incident on said first port to said second port, and for directionally transporting light energy incident on said second port to said third port, said first port coupled to said light emitting means;

second beam splitting means having first, second, and third ports for directionally transporting light energy incident on said first port to said second and third ports, and for directionally transporting light energy incident on said second and third ports to said first port, said first port of said second beam splitting means coupled to said second port of said first beam splitting means, said second port of said second beam splitting means being connected to said first end of said optical path means, said third port of said second beam splitting means being connected to said second end of said optical path means;

third beam splitting means having first, second and third ports, for directionally transporting light energy incident on said first port to said second port, and for directionally transporting light energy incident on said second port to said first and third ports, said first port of said third beam splitting means being coupled to said second port of said second beam splitting means;

phase modulation means connected along said optical path means and being coupled to said second port of said third beamsplitting means, for impressing a modulation frequency on light propagating in both directions along said optical path means, said phase modulation means being at least slightly offset from the center of said optical path means with respect to said second beam splitting means;

first phase sensitive detection means, optically connected to said third port of said first beam splitting means, and also connected to said phase modulation means, for detecting light from said first beam splitting means;

second phase sensitive detection means, optically connected to said third port of said third beam splitting means and to said light emitting means, for detecting light from said third beam splitting means, and processor means, connected to said first and said second phase sensitive detection means, for providing a position output and an amplitude output for the location and severity, respectively, of an environmental disturbance along said optical path means;

said light emitting means further comprising:

a light source current driver having an input coupled to said second phase sensitive detection means, and an output; and a light source having an input coupled to said output of said light source current driver, and an output coupled to said first port of said first beam splitting means.

14. A fiber optic sensor, comprising:

light emitting means for producing a first beam of light;

first beam splitting means, optically connected to said light emitting means, for receiving light and transmitting said first beam of light from said light emitting means and for coupling said received light in at least one other direction;

second beam splitting means, having a first port optically connected to said first beam splitting means and a second and third port, for receiving said first beam of light into said first port from said first beam splitting means and splitting said first beam of light into a second and a third beam of light into said second and said third ports, and for recombining said second and said third beams of light into a fourth beam of light;

third beam splitting means optically connected to said second port of said second beam splitting means for coupling a portion of said second beam of light away from said second beam splitting means;

optical path means, connected to said second beam splitting means, for directing said second and said third beams of light in counterpropagating directions;

phase modulation means, optically connected to said optical path means and to said third port of said second beam splitting means, for impressing a phase difference between said second and said third beams of light oscillating means, connected to said phase modulation means, for generating a frequency signal and transmitting said frequency signal to said phase modulating means;

first detector means, connected to said first beam splitting means, for sensing said fourth beam of light;

first phase sensitive detection means, connected to said oscillating means and first detector means, for demodulating an environmental signal detected by said first detector means;

second detector means, connected to said third beam splitting means, for sensing said third beam of light;

second phase sensitive detection means, connected to said second detector means, for demodulating an environmental signal detected by said second detector means;

variable oscillating means, connected to said second phase sensitive detection means and said light emitting means, for generating and transmitting a variable second frequency signal to said light source means;

integration means, having an input connected to said second phase sensitive detection means and having an output connected to said variable oscillating means, for generating a signal, said signal being the integral of the output of said second phase sensitive detection means and for providing said signal to said variable oscillating means; and, signal processing means, having inputs connected to said variable oscillating means and said first phase sensitive detecting means, for generating a position signal and an amplitude signal indicative of the location and severity of an environmental disturbance along said optical path means.

15. The fiber optic sensor of claim 14 wherein said first, said second and said third beam splitting means further comprises a fiber optic beamsplitter.

16. The fiber optic sensor of claim 15 wherein said light emitting means further comprises a light emitting diode.

17. The fiber optic sensor of claim 15 wherein said light emitting means further comprises a superradiant diode.

18. The fiber optic sensor of claim 17 wherein said optical path means further comprises at least one optical fiber.

19. The fiber optic sensor of claim 18 wherein said phase modulation means further comprises:
a piezoelectric core; and
an optical fiber surrounding said piezoelectric core.

20. The optic sensor of claim 14 further comprising polarizing means, optically connected between said first beam splitting means and said second beam splitting means, for polarizing said light produced from said light emitting means.

21. The fiber optic sensor of claim 20 wherein said first, said second, and said third beam splitting means further comprises fiber optic beamsplitters.

22. The fiber optic sensor of claim 21 wherein said optical path means further comprises at least one optical fiber.

23. The fiber optic sensor of claim 22 wherein said phase modulation means further comprises:
a piezoelectric core; and
an optical fiber surrounding said piezoelectric core.

24. The fiber optic sensor of claim 23 wherein said light emitting means further comprises a light emitting diode.

25. The fiber optic sensor of claim 23 wherein said light emitting means further comprises a superradiant diode.

26. The optic sensor of claim 20 further comprising intensity maintenance means, optically connected between said polarizing means and said second beam splitting means, for maintaining the intensity of said first beam of light produced from said light emitting means.

27. The fiber optic sensor of claim 26 wherein said first and said second beam splitting means further comprises fiber optic beamsplitters.

28. The fiber optic sensor of claim 27 wherein said optical path means further comprises at least one optical fiber.

29. The fiber optic sensor of claim 28 wherein said phase modulation means further comprises:
a piezoelectric core; and,
an optical fiber surrounding and piezoelectric core.

30. The fiber optic sensor of claim 29 wherein said light emitting means further comprises a light emitting diode.

31. The fiber optic sensor of claim 29 wherein said light emitting means further comprises a superradiant diode.

32. A fiber optic sensor, comprising:
first light emitting means for producing a first beam of light;

first beam splitting means, optically connected to said first light emitting means, for receiving light from said first light emitting means, and for directing light in at least two directions other than said first light emitting means;

second beam splitting means, optically connected to said first beam splitting means, for receiving said first beam of light from said first light emitting means through said first beam splitting means, and for splitting said received light into a second and a third beam of light, and for recombining said first and said second beams into a fourth beam of light;

fiber optic path means, optically connected to said second beam splitting means, for directing said first and said second beams in counterpropagating directions along a common path;

third beam splitting means, optically connected along and near one end of said fiber optic path;

phase modulation means, having an input and optically connected along and near one end of said fiber optic path means, for impressing a first modulation frequency on one of said second and third beams of light as it enters said fiber optic path means and upon the other of said second and third beams of light as it leaves said fiber optic path means;

first phase sensitive detection means, optically connected to said first beam splitting means and electrically connected to said phase modulation means, for detecting light from said first beam splitting means;

second phase sensitive detection means, optically connected to said second beam splitting means, for detecting said fourth beam of light from said second beam splitting means;

light modulation means, connected to said second phase sensitive detection means and optically connected to said third beam splitting means, for coupling an amplitude modulated beam of light into said fiber optic path means;

processor means, connected to said first and said second phase sensitive detection means, for providing a position output and an amplitude output.

33. A fiber optic sensor, comprising:

Optical path means for facilitating the propagation of light said optical path means having first and second ends;

first light emitting means for producing light energy;

first beam splitting means, having first, second and third ports, for directionally transporting light energy incident on said first port to said second port, and for directionally transporting light energy incident on said second port to said third port, said first port coupled to said first light emitting means;

Second beam splitting means having first, second, and third ports for directionally transporting light energy incident on said first port to said second and third ports, and for directionally transporting light energy incident on said second and third ports to said first port, said first port of said second beam splitting means coupled to said second port of said first beam splitting means, and wherein said second port of said second beam splitting means is coupled to said first end of said optical path means;

Third beam splitting means having first, second and third ports, for directionally transporting light energy incident on said first port to said second port, and for directionally transporting light energy incident on said second port to said first port, and for directionally transporting light energy incident on said third port to said second port, said second port of said third beam splitting means coupled to said second end of said optical path means;

phase modulation means connected to said first port of said third beam splitting means and to said third port of said second beam splitting means, for impressing a modulation frequency on light as it exits said second end of said optical path means and on light as it enters said second end of said optical path means, said phase modulation means at least slightly offset from the center of said optical path means with respect to said second beam splitting means;

second light emitting means, coupled to said third port of said third beam splitting means, for producing light energy;

first phase sensitive detection means, optically connected to said third port of said first beam splitting means, and also connected to said phase modulation means, for detecting light from said first beam splitting means;

second phase sensitive detection means, optically connected to said second port of said second beam splitting means and to said second light emitting means, for detecting light from said third beam splitting means and modulating said second light emitting means; and, processor means, connected to said first and said second phase sensitive detection means, for providing a position output and an amplitude output for the location and severity, respectively, of an environmental disturbance along said optical path means.

34. The fiber optic sensor of claim 33 wherein said second phase sensitive detection means further comprises:
a detector having an input connected to said second port of said second beam splitting means, and an output;
a phase sensitive detector having a first input connected to the output of said detector, a second input, a first output connected to said signal processing means, and a second output;
an integrator having an input connected to said second output of said phase sensitive detector, and an output; and,
a light modulation variable frequency oscillator having an input connected to said output of said integrator, a first output connected to said second input of said phase sensitive detector, and a second output connected to said second light emitting means.

35. The fiber optic sensor of claim 33 wherein said first phase sensitive detection means further comprises:
a detector connected to said third port of said first beam splitting means; and,
a phase sensitive detector having a first input electrically connected to said detector, a second input, and an output electrically connected to said signal processing means; and,
an oscillator having a first output connected to said second input of said phase sensitive detector, and a second output connected to said input of said phase modulation means.

36. The fiber optic sensor of claim 33, wherein said phase modulation means is an integrated optic modulator.

37. The fiber optic sensor of claim 34, wherein said phase modulation means is an integrated optic modulator.

38. The fiber optic sensor of claim 33 wherein first, second and third beam splitting means further comprises a fiber optic beamsplitters.

39. The fiber optic sensor of claim 33 wherein said fiber optic path means further comprises at least one optical fiber.

40. The fiber optic sensor of claim 33 wherein said first and second light emitting means further comprises a light emitting diode.

41. The fiber optic sensor of claim 36 wherein said first and second light emitting means further comprises a superradiant diode.

42. The optic sensor of claim 36 further comprising:
polarization means, optically coupled to said second port of said first beam splitting means, for polarizing said light produced from said light emitting means; and,
intensity maintenance means, optically coupled to said polarization means and to said first port of said second beam splitting means, for maintaining the power of said light emanating from said light emitting means.

43. The fiber optic sensor of claim 42 wherein said polarization means further comprises a fiber optic polarizer.

44. The fiber optic sensor of claim 42 wherein said intensity maintenance means further comprises a fiber optic intensity maintenance element.

45. The process of detecting an environmental disturbance along a fiber optic path comprising the steps of:
generating a beam of light modulated with a first frequency;
splitting said modulated beam of light into a first beam of light and into a second beam of light;
splitting said first beam of light into a third clockwise propagating beam of light and into a fourth counterclockwise propagating beam of light, both along said fiber optic path;

phase modulating said third and said fourth beams of light with a second frequency near one end of their counterpropagating fiber optic path;

recombining said third and said fourth beams of light into a fifth beam of light;

detecting said phase of said first frequency of modulation within said fifth beam of light;

detecting said phase of said second frequency of modulation within said fourth beam of light; and, computing the intensity and location of an environmental disturbance along said fiber optic path utilizing said detected phases of said first and said second frequencies of modulation.

46. The process of detecting an environmental disturbance along a fiber optic path as recited in claim 45, wherein said detecting of said phase of said first frequency of modulation step and said detecting of said phase of said second frequency of modulation step are performed simultaneously.

* * * * *